No. 680,709. Patented Aug. 20, 1901.
L. GOCHT.
MEANS FOR LOCKING NUTS AND BOLT HEADS.
(Application filed Apr. 9, 1901.)
(No Model.)

Witnesses
A. J. Haddaus
E. M. Moore

Inventor
Louis Gocht
by his Attorney R. Haddan

United States Patent Office.

LOUIS GOCHT, OF CHEMNITZ, GERMANY.

MEANS FOR LOCKING NUTS AND BOLT-HEADS.

SPECIFICATION forming part of Letters Patent No. 680,709, dated August 20, 1901.

Application filed April 9, 1901. Serial No. 55,095. (No model.)

*To all whom it may concern:*

Be it known that I, LOUIS GOCHT, a subject of the Emperor of Germany, residing and having my post-office address at Josephinenstrasse 19, Chemnitz, Saxony, Germany, have invented certain new and Improved Means for Locking Nuts and Bolt-Heads, of which the following is a specification.

The present invention relates to means for securing nuts and bolt-heads against revolution or loosening. These means consist in making the washer employed with the nut or bolt with an elevated portion in such a manner that the nut or bolt-head is partially surrounded by said elevated portion. In the latter curved or crooked grooves are made, into which nails or wire pins can be driven in such a manner that the ends thereof are caused to abut directly against the side of the nut or bolt-head.

In the annexed drawings one form of the invention is represented.

Figure 1:
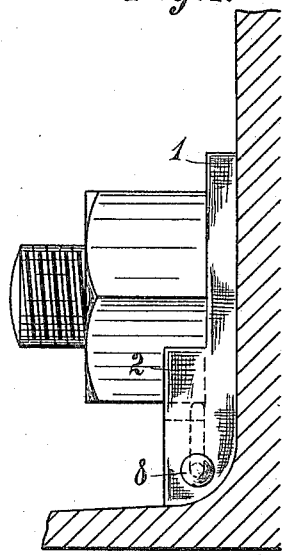
Figure 2:
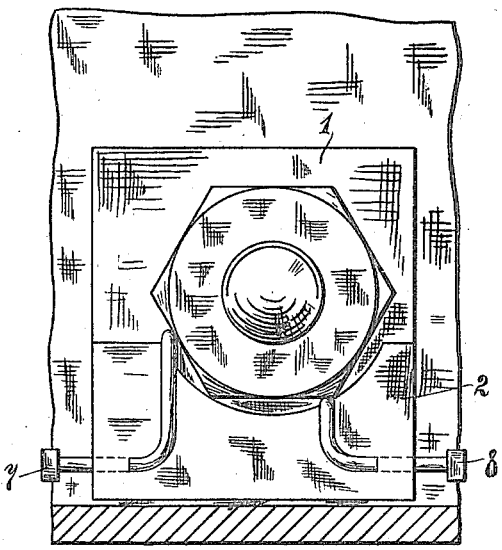
Figure 3:
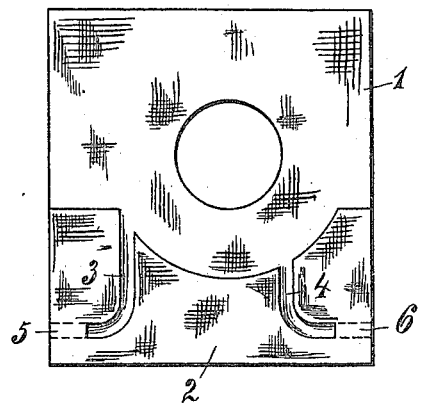

Figure 1 is a side view, Fig. 2 a plan view, and Fig. 3 a plan, of the washer removed.

The washer consists of a low or narrow portion 1 and a raised or wide portion 2. The latter only partially surrounds the hole through which the bolt passes, and its edge preferably follows an arc of a circle, as shown in Figs. 2 and 3. In the said raised portion two grooves or channels 3 and 4 are made. Preferably the said grooves do not extend to the outer edges of the washer, but terminate before they reach said edges; but they are continued thereto by suitable holes 5 and 6. The grooves 3 and 4 preferably end nearest the nut or bolt-head unsymmetrically with regard to the hole in the washer.

When the nut has been screwed onto the bolt in the usual manner two nails or wire pins 7 and 8 are uniformly driven into the holes 5 and 6 and from thence into the grooves 3 and 4. The nails become bent into the shape of the grooves, and their ends abut against the circumference of the nuts against which they strike first and prevent said nut from turning. Only one of the pins will act as a locking device.

What I claim is—

1. The combination with a nut or bolt-head, of a washer having a raised or widened portion partly surrounding the nut or bolt-head, said raised or widened portion being provided with grooves, and pins adapted to be driven into said grooves, and abutting against the side of the nut or bolt-head so that one of them locks same against revolution, substantially as described.

2. The combination with a nut or bolt-head, of a washer having a raised or widened portion partly surrounding the nut or bolt-head, said raised or widened portion being provided with curved grooves, and pins adapted to be driven into said grooves, the ends of said pins abutting against the side of the nut or bolt-head so that one of them locks same against revolution, substantially as described.

3. The combination with a nut or bolt-head, of a washer having a raised or widened portion partly surrounding the nut or bolt-head, said raised or widened portion being provided with grooves, terminating at one end before reaching the edges of the washer, but continued thereto in the form of holes, and pins adapted to be driven through said holes into the grooves, the ends of said pins abutting against the side of the nut or bolt-head so that one of them locks same against revolution, substantially as described.

4. The combination with a nut or bolt-head, of a washer having a raised or widened portion partly surrounding the nut or bolt-head, said raised or widened portion being provided with two grooves, terminating at one end before reaching the edges of the washer, but continued thereto in the form of holes, and terminating at the other end unsymmetrically with regard to the bolt-hole, and two pins adapted to be driven through said holes into the grooves, the ends of said pins abutting against the side of the nut or bolt-head, so that one of them locks same against revolution, substantially as described.

In witness whereof I have signed this specification in the presence of two witnesses.

LOUIS GOCHT.

Witnesses:
FREDERICK J. DIETZMAN,
BERNHARD BLANK.